US011199233B2

United States Patent
Dong et al.

(10) Patent No.: US 11,199,233 B2
(45) Date of Patent: Dec. 14, 2021

(54) FRICTION MATERTIAL

(71) Applicant: BorgWarner Inc., Auburn Hills, MI (US)

(72) Inventors: Feng Dong, Rochester, MI (US); Robert C. Lam, Rochester, MI (US)

(73) Assignee: BorgWarner Inc., Auburn Hills, MI (US)

( * ) Notice: Subject to any disclaimer, the term of this patent is extended or adjusted under 35 U.S.C. 154(b) by 232 days.

(21) Appl. No.: 16/060,329

(22) PCT Filed: Nov. 23, 2016

(86) PCT No.: PCT/US2016/063465
§ 371 (c)(1),
(2) Date: Jun. 7, 2018

(87) PCT Pub. No.: WO2017/100001
PCT Pub. Date: Jun. 15, 2017

(65) Prior Publication Data
US 2019/0003544 A1    Jan. 3, 2019

Related U.S. Application Data

(60) Provisional application No. 62/264,644, filed on Dec. 8, 2015.

(51) Int. Cl.
*F16D 69/02* (2006.01)
*F16D 69/04* (2006.01)
(Continued)

(52) U.S. Cl.
CPC ........... *F16D 69/026* (2013.01); *F16D 13/64* (2013.01); *F16D 69/04* (2013.01);
(Continued)

(58) Field of Classification Search
CPC .............. F16D 13/64; F16D 2069/008; F16D 2069/0466; F16D 2200/0069;
(Continued)

(56) References Cited

U.S. PATENT DOCUMENTS 4,111,891 A    9/1978 Reynolds, Jr.
4,119,591 A    10/1978 Aldrich
(Continued)

FOREIGN PATENT DOCUMENTS

| JP | H0939144 A | 2/1997 |
| JP | 2007255623 A | 10/2007 |
| JP | 2010121665 A | 6/2010 |

OTHER PUBLICATIONS

English language abstract for JPH 09-39144 extracted from espacenet.com database on Apr. 16, 2018, 2 pages.
(Continued)

*Primary Examiner* — Callie E Shosho
*Assistant Examiner* — Krupa Shukla
(74) *Attorney, Agent, or Firm* — Howard & Howard Attorneys PLLC

(57) ABSTRACT

A friction material comprises a base and a friction generating layer penetrating into and integral with the base. The base presents a bonding surface. The friction generating layer presents a friction generating surface facing opposite the bonding surface of the base. The friction generating layer comprises fibrillated nanofibers, friction adjusting particles, and elastomeric particles. A curable resin is dispersed throughout the friction generating layer and the base of the friction material.

17 Claims, 3 Drawing Sheets

(51) Int. Cl.
*F16D 13/64* (2006.01)
*F16D 69/00* (2006.01)

(52) U.S. Cl.
CPC .... *F16D 69/0408* (2013.01); *F16D 2069/008* (2013.01); *F16D 2069/0466* (2013.01); *F16D 2200/0069* (2013.01)

(58) Field of Classification Search
CPC .... F16D 69/026; F16D 69/04; F16D 69/0408; B32B 15/06; B32B 2305/026; B32B 2317/22; B32B 2319/00; B32B 2475/00; B32B 25/02; B32B 9/005; B32B 9/043; C08K 3/00; C08K 7/02; C08K 3/013; C08K 5/54
See application file for complete search history.

(56) References Cited

U.S. PATENT DOCUMENTS

| | | | |
|---|---|---|---|
| 4,218,361 | A | 8/1980 | Searfoss et al. |
| 5,707,905 | A | 1/1998 | Lam et al. |
| 5,753,356 | A | 5/1998 | Lam et al. |
| 5,856,244 | A | 1/1999 | Lam et al. |
| 5,858,883 | A | 1/1999 | Lam et al. |
| 5,958,507 | A | 9/1999 | Lam et al. |
| 5,998,307 | A | 12/1999 | Lam et al. |
| 6,001,750 | A | 12/1999 | Lam |
| 6,130,176 | A | 10/2000 | Lam |
| 6,521,339 | B1 | 2/2003 | Hansen et al. |
| 6,630,416 | B1 | 10/2003 | Lam et al. |
| 6,780,283 | B2 | 8/2004 | Umezawa et al. |
| 8,603,614 | B2 | 12/2013 | Lam et al. |
| 2002/0137844 | A1* | 9/2002 | Narisawa ............... C08L 61/06 525/100 |
| 2006/0009541 | A1 | 1/2006 | Chen et al. |
| 2012/0108698 | A1 | 5/2012 | Lam et al. |
| 2013/0037373 | A1 | 2/2013 | Dong et al. |
| 2015/0307806 | A1* | 10/2015 | Sasaki ............... C08L 83/04 508/107 |

OTHER PUBLICATIONS

English language abstract and machine-assisted English translation for JP 2007-255623 extracted from espacenet.com database on Apr. 16, 2018, 18 pages.
English language abstract and machine-assisted English translation for JP 2010-121665 extracted from espacenet.com database on Apr. 16, 2018, 16 pages.
International Search Report for Application No. PCT/US2016/063465 dated Mar. 13, 2017, 2 pages.
Chan, D. et al., "Review of Automative Brake Friction Materials", Proc. Instn. Mech. Engrs., vol. 218, Part D: J. Automobile Engineering, 2004, pp. 953-966.
Custom Milling & Consulting, "Beckman Coulter LS Particle Size Analyzer", May 22, 2011, 1 page.
Engineered Fibers Technology, "EFTed Nanofibrillated Fibers", 2015, 3 pages.
Palmer International, Inc., "Product Specification-6250-1—F49", Jan. 12, 1999, 2 pages.
Palmer Internatinal, Inc., "6000-4", 1999, 1 page.
Palmer International, "Case Study: Compressibility-Cashew Particles and Compressibility", http://www.palmerint.com/case-studies, 2014, 16 pages.
Sundar Krisshnaa, K.L., "Abstract of Friction Material Composites: Copper/Matal-Free Material Design Perspective", 2nd Edition, 2015, 1 page.

* cited by examiner ns
FRICTION MATERTIAL

CROSS-REFERENCE TO RELATED APPLICATIONS

The present application is the National Stage of International Patent Application No. PCT/US2016/063465, filed on Nov. 23, 2016, which claims priority to and all the benefits of U.S. Provisional Patent Application No. 62/264,644, filed on Dec. 8, 2015, which are both hereby expressly incorporated herein by reference in their entirety.

FIELD OF THE DISCLOSURE

The subject disclosure generally relates to a friction material comprising a base and an indiscreet friction generating layer. The friction material can be used in a friction plate in a clutch assembly in a transmission.

DESCRIPTION OF THE RELATED ART

Several components of a motor vehicle powertrain may employ a wet clutch to facilitate the transfer of power from the vehicle's power generator (i.e. an internal combustion engine, electric motor, fuel cell, etc.) to the drive wheels. A transmission located downstream from the power generator and which enables vehicle launch, gear shifting, and other torque transfer events is one such component. Some form of a wet clutch may be found throughout many different types of transmissions currently available for motor vehicle operation. A wet clutch may be utilized in a torque converter for an automatic transmission, a multi-plate wet clutch pack for an automatic transmission or a semi-automatic dual-clutch transmission (DCT), and a wet start clutch that may be incorporated into a sportier automatic transmission equipped with as many as seven to nine gears as a substitute for the torque converter, to name but a few exemplary applications. Similar wet clutches may be found elsewhere in the vehicle powertrain besides the transmission.

A wet clutch is an assembly that interlocks two or more opposed, rotating surfaces in the presence of a lubricant by imposing selective interfacial frictional engagement between those surfaces. A friction plate, a band, a synchronizer ring, or some other part that provides one of these engageable rotating surfaces typically supports a friction material to effectuate the intended interlocking frictional engagement. The presence of the lubricant at the friction interface cools and reduces wear of the friction material and permits some initial slip to occur so that torque transfer proceeds gradually, although very quickly, in an effort to avoid the discomfort that may accompany an abrupt torque transfer event (i.e., shift shock).

Conventional friction materials generally do not function reliably in such wet clutch applications, especially the more recent clutch applications such as wet start clutch applications and shifting applications, e.g. semi-automatic DCT applications. Although friction materials having improved coefficient of friction ("COF") have been developed in an attempt to meet the demands of these wet clutch applications, many of the friction materials developed only demonstrate improved COF under certain application conditions (e.g. sufficient dynamic COF) but lack the requisite COF under other application conditions (e.g. insufficient static COF). As such, the friction materials developed for these wet clutch applications contribute to a variety of complications including lack of sufficient torque transfer, shuddering, and shift shock.

Due to the inadequacies of existing friction materials, there remains an opportunity to provide an improved friction material demonstrating improved COF over a range of dynamic and static conditions.

SUMMARY OF THE DISCLOSURE AND ADVANTAGES

A friction material comprises a base and an indiscreet friction generating layer penetrating into and integral with the base. The base presents a bonding surface. The friction generating layer presents a friction generating surface parallel to and facing opposite the bonding surface of the base. The friction generating layer comprises fibrillated nanofibers, friction adjusting particles, and elastomeric particles. A curable resin is dispersed throughout the friction generating layer and the base of the friction material. The composition of the friction generating layer provides the friction material with improved COF over a range of dynamic and static conditions.

BRIEF DESCRIPTION OF THE DRAWINGS

Other advantages of the present invention will be readily appreciated, as the same becomes better understood by reference to the following detailed description when considered in connection with the accompanying drawings.

FIGS. 1-5 are exemplary in nature and are not drawn to scale and are thus not intended to represent the relative sizes of the various components of the friction material, e.g. the friction generating layer, the base, the friction generating particles, the fibrillated nanofibers, the elastomeric particles, etc.

DETAILED DESCRIPTION OF THE DISCLOSURE

Referring to the Figures, wherein like numerals indicate corresponding parts throughout the several views, a friction material is shown generally at 10 and a friction plate is shown generally at 30.

The friction material 10 described herein is typically used on a friction plate 30 which is included in a wet clutch assembly in a transmission of a motor vehicle. However, it is to be appreciated that the friction material 10 and friction plate 30 described herein can be used in other vehicular applications and have applications beyond motor vehicles.

Figure 1:
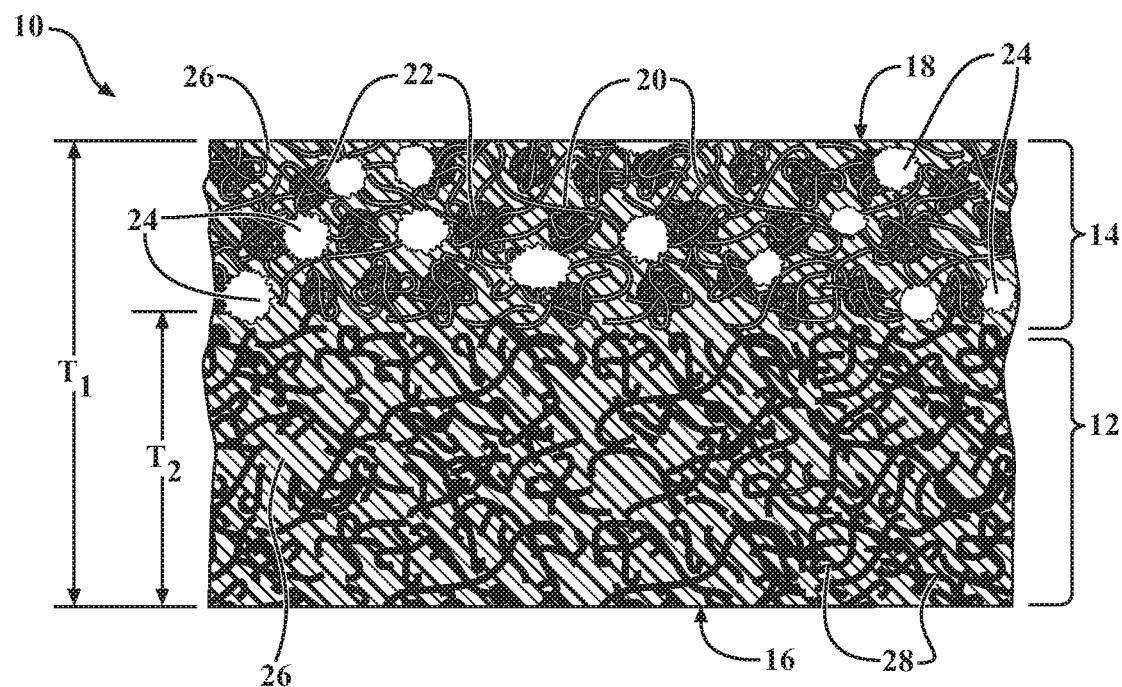
FIG. 1 is an enlarged cross-sectional view of a friction material including a friction generating layer and a base.

Referring now to FIG. 1, the friction material 10 comprises a base 12 and an indiscreet friction generating layer 14 penetrating into and integral with the base 12. The friction generating layer 14 is also known in the art as a deposit layer or a deposit. The base 12 presents a bonding surface 16. The friction generating layer 14 presents a friction generating surface 18 facing opposite (and parallel to) the bonding surface 16 of the base 12. A curable resin 26 is dispersed throughout the friction generating layer 14 and the base 12 of the friction material 10.

Still referring to FIG. 1, the friction material 10 has a thickness $T_1$ defined as a distance between the friction generating surface 18 and the bonding surface 16. In various embodiments, the friction generating layer 14 extends from the friction generating surface 18 towards the bonding surface 16 up to about 40%, alternatively up to about 30%, alternatively up to about 20%, alternatively up to about 10%, alternatively up to about 5%, of the thickness $T_1$. The base 12 typically has a thickness $T_2$ of less than about 2 mm, alternatively from about 0.25 mm to about 2 mm, alternatively from about 0.3 mm to about 1 mm, alternatively of from about 0.3 mm to about 0.4 mm. If the friction material 10 is about 0.25 mm to about 2 mm thick, which is typical for a friction material 10 applied to a clutch plate (wet clutch) in a transmission, the friction generating layer 14 may extend inwards from the friction generating surface 18 to a depth up to about 0.0125 mm (5% of 0.25 mm) to about 0.80 mm (40% of 2 mm).

Figure 2:
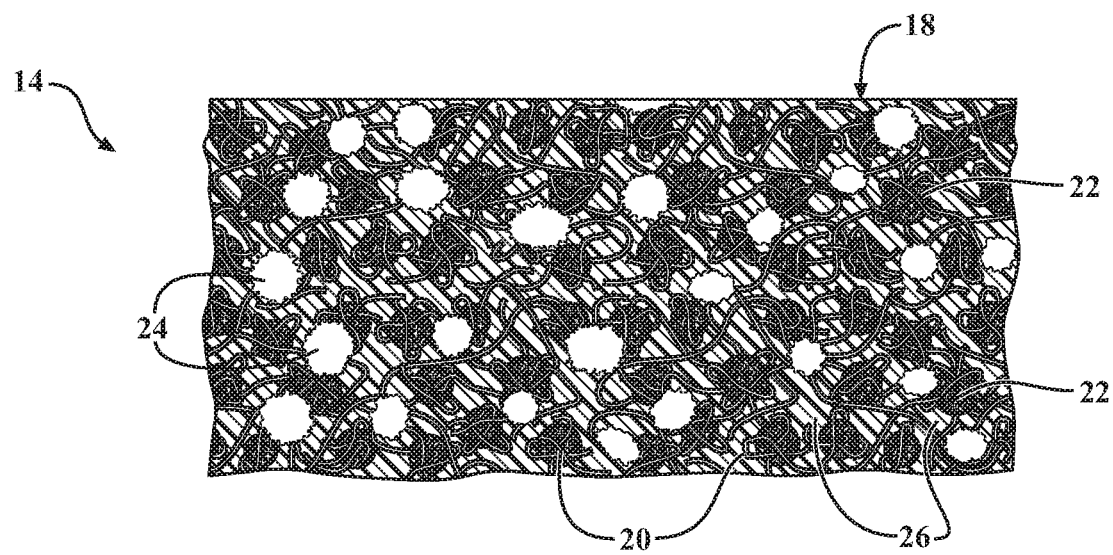
FIG. 2 is an enlarged, isolated cross-sectional view of the friction generating layer of FIG. 1.

Referring now to FIG. 2, the friction generating layer 14 comprises fibrillated nanofibers 20, friction adjusting particles 22, and elastomeric particles 24. The friction generating layer 14 may be referred to as indiscreet because the fibrillated nanofibers 20, the friction adjusting particles 22, and the elastomeric particles 24, are applied to, and typically penetrate into, the base 12. Likewise, particles and fibers of the base 12 may penetrate into the friction generating layer 14. Accordingly, the friction generating layer 14 and the base 12 are integral layers within the friction material 10.

In various embodiments, the friction generating layer 14 comprises, consists essentially of, or consists of, the fibrillated nanofibers 20, the friction adjusting particles 22, and the elastomeric particles 24. In some embodiments, the friction generating layer 14 comprises, consists essentially of, or consists of, a single type of the fibrillated nanofibers 20, a single type of the friction adjusting particles 22, and a single type of the elastomeric particles 24.

As used herein, "consists essentially of" is used to describe embodiments that include the specified components (e.g. a friction material 10 including a friction generating layer 14 including the fibrillated nanofibers 20, the friction adjusting particles 22, and the elastomeric particles 24) which is free of, or substantially free of (e.g. includes less than 5 wt. % or less than 1 wt. %), other compounds and additives.

Referring now to the elastomeric particles 24 of the friction generating layer 14, the elastomeric particles 24 are particles which are elastic and exhibit rubber-like properties. Use of the elastomeric particles 24 in the friction generating layer 14 provides improved compressibility and an increased coefficient of friction over a wide range of temperatures and conditions. Suitable elastomeric particles 24 are chosen from particles derived from cashew nut shell oil, rubber, and combinations thereof.

In various embodiments, the elastomeric particles 24 have an elastic modulus of from about 0.01 to about 3, alternatively from about 0.01 to about 2, alternatively from about 0.02 to about 1, alternatively from about 0.03 to about 0.3, GPa.

In various embodiments, the elastomeric particles 24 have a compressibility of from about 1 to about 10, alternatively from about 1.5 to about 7.5, % when tested in accordance with ISO 6310.

In various embodiments, the elastomeric particles 24 have a first deflection (amount compressed from original diameter/thickness) of from about 0.5 to about 10, alternatively from about 1 to about 7, % of original thickness when tested in accordance with ISO 6310.

In various embodiments, the elastomeric particles 24 have a first hysteresis (amount of lost diameter/thickness after load removed) of from about 0.1 to about 10, alternatively from about 0.2 to about 7, % of original thickness when tested in accordance with ISO 6310.

In some embodiments, the elastomeric particles 24 comprise, consist essentially of, or consist of rubber. Rubber is a polymer that exhibits elasticity. Rubber can be a natural rubber, a modified natural rubber, or a synthetic rubber. The rubber can be defined as an elastomer or a thermoplastic elastomer. In various embodiments the elastomeric particles 24 comprise, consist essentially of, or consist of silicone rubber (including modified silicone rubber), styrene butadiene rubber ("SBR"), butyl rubber, thermoplastic elastomers (including ethylene acrylic elastomers) and halogenated rubbers such as chlorobutyl rubber, bromobutyl rubber, polychloroprene rubber, fluoro rubber (sometimes referred to as fluoroelastomer or perfluoroelastomer), and nitrile rubber (sometimes referred to as buna-N, perbunan, acrylonitrile butadiene rubber, NBR, hydrogenated NBR).

In some embodiments, the elastomeric particles 24 comprise, consist essentially of, or consist of fluororubber (fluoroelastomer) categorized under the ASTM D1418 & ISO 1629 designation of FKM. This class of elastomers is a family comprising copolymers of hexafluoropropylene (HFP) and vinylidene fluoride (VDF or VF2), terpolymers of tetrafluoroethylene (TFE), vinylidene fluoride (VDF) and hexafluoropropylene (HFP) as well as perfluoromethylvinylether (PMVE) containing specialties.

In some embodiments, the elastomeric particles 24 comprise, consist essentially of, or consist of, silicone rubber. In other embodiments the elastomeric particles 24 comprise, consist essentially of, or consist of, nitrile rubber.

In a preferred embodiment, the elastomeric particles 24 comprise, consist essentially of, or consist of, cashew nut particles or particles derived from cashew nut shell oil. Cashew nut particles comprise cashew nut shell liquid, which is a naturally occurring compound found in the honeycomb structure of a cashew nut shell. In some embodiments, the elastomeric particles 24 comprise cashew nut particles which are brown, and in other embodiments, the elastomeric particles 24 comprise cashew nut particles which are black. In such embodiments, the particles may be screened to 100, 90, 80, 70, 60, 50, or 40, mesh.

In various embodiments, the elastomeric particles 24 have average diameters of less than about 40 μm, alternatively from about 2 μm to about 40 μm, alternatively from about 5 μm to about 30 μm, alternatively from about 5 μm to about 15 μm. Advantageously, elastomeric particles 24 of the friction generating layer 14 having an average diameter of less than about 40 μm typically improve the compression of the friction generating layer 14 and, importantly, when used in combination with the friction adjusting particles 22 and the fibrillated nanofibers 20 unexpectedly yield a friction generating surface 18 having an improved static COF as is explained throughout this disclosure. Without being bound by theory, it is believed that the elasticity and relative lack of rigidity provided by the particles provide a cushioning effect upon compression of the friction generating surface 18 of the friction material 10 which evenly distributes pressures at elevated temperature and, thus, improves the static COF of the friction generating surface 18 without negatively effecting the dynamic COF of the friction generating surface 18.

In one embodiment, the friction material 10 comprises the base 12 and the friction generating layer 14 comprising the fibrillated nanofibers 20, the friction adjusting particles 22, and the elastomeric particles 24 having an average diameter of less than about 40 μm. In this embodiment, the elastomeric particles 24 having an average diameter of less than about 40 μm are included in the friction generating layer 14 in an amount sufficient to increase the static COF of the of the friction generating surface 18.

Further, in various embodiments, the elastomeric particles 24 have a thermal stability of about 200° C. or greater, alternatively about 250° C. or greater, alternatively about 300° C. or greater, alternatively about 350° C. or greater. By thermal stability it is meant that the elastomeric particles 24 do not melt, soften, or decompose. The thermal stability of the elastomeric particles 24 is typically determined by thermal gravimetric analysis ("TGA"). The temperature at which a test sample of the elastomeric particles 24 analyzed via TGA loses 5 wt. % based on a total weight of the test sample is the temperature at which the elastomeric particles 24 lose thermal stability.

The elastomeric particles 24 are typically present in the friction material 10 in an amount of from about 3 to about 15 lbs per 3000 ft² (about 1.4 to about 6.8 kg per 278.7 m²) of the friction generating surface 18, alternatively from about 6 to about 12 lbs per 3000 ft² (about 2.7 kg to about 5.4 kg per 278.7 m²) of the friction generating surface 18, alternatively from about 8 to about 10 lbs per 3000 ft² (about 3.6 kg to about 4.5 kg per 278.7 m²) of the friction generating surface 18, alternatively about 9 lbs per 3000 ft² (about 4.1 kg per 278.7 m²) of the friction generating surface 18. The amount of the elastomeric particles 24 present in the friction generating layer 14 may vary outside of the ranges above, but is typically both whole and fractional values within these ranges. Further, it is to be appreciated that more than one type of the elastomeric particles 24 may be included in the friction generating layer 14, in which case the total amount of all the elastomeric particles 24 present in the friction generating layer 14 is within the above ranges.

The amount of the components in the friction generating layer 14 provided herein are in units of pounds per 3000 ft², such units are customarily used in the paper making industry as a measurement of weight based on a given surface area of a thin layer, whether impregnated with the curable resin 26 or not. Above, the units express the weight of the elastomeric particles 24 present in the friction generating layer 14 for every 3000 ft² of the friction generating surface 18. Further below, the units express the weight of the fibrillated nanofibers 20 and the friction adjusting particles 22 present in the friction generating layer 14 for every 3000 ft² of the friction generating surface 18.

Referring now to the friction adjusting particles 22 of the friction generating layer 14, the friction adjusting particles 22 increase the dynamic COF of the friction generating surface 18. Various suitable friction adjusting particles 22 are chosen from silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, and combinations thereof. Alternatively, various suitable friction adjusting particles 22 comprise, consist essentially of, or consist of, silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, or combinations thereof.

In a preferred embodiment, the friction adjusting particles 22 comprise, consist essentially of, or consist of diatomaceous earth. Diatomaceous earth is a mineral comprising silica. Diatomaceous earth is an inexpensive, abrasive material that exhibits a relatively high COF which readily disperses throughout the fibrillated nanofibers 20 of the friction generating layer 14. Of course, all of the friction adjusting particles 22 included in the friction generating layer 14 may be diatomaceous earth or, alternatively, the friction adjusting particles 22 may include a combination of different types of the friction adjusting particles 22, such as various combinations of diatomaceous earth, carbon, graphite, and alumina. The type or types of the friction adjusting particles 22 included in the friction generating layer 14 may vary depending on the friction characteristics sought at the friction generating surface 18 of the friction material 10.

In various embodiments, the friction adjusting particles 22 have a Mohs hardness of from about 2 to about 9, alternatively from about 3 to about 9, alternatively from about 5 to about 6.5, alternatively from about 5.5 to about 6. The hardness of the friction adjusting particles 22 stands in contrast to the elasticity/elastic modulus of the elastomeric particles 24 and it is believed that the disclosed combination of friction adjusting particles 22 and elastomeric particles 24 provides the friction generating layer 14 with excellent static and dynamic friction characteristics.

In various embodiments, the friction adjusting particles 22 have an average diameter of from about 1 μm to about 30 μm, alternatively from about 5 μm to about 16 μm. Further, in various embodiments, the friction adjusting particles 22 have a thermal stability of about 400° C. or greater, alternatively 450° C. or greater, alternatively 500° C. or greater. By thermal stability it is meant that the friction adjusting particles 22 do not melt, soften, or decompose. The thermal stability of the friction adjusting particles 22 is typically determined by TGA. The temperature at which a test sample of the friction adjusting particles 22 analyzed via TGA loses 5 wt. % based on a total weight of the test sample is the temperature at which the friction adjusting particles 22 lose thermal stability.

The friction adjusting particles 22 are typically present in the friction material 10 in an amount of from about 7 to about 23 lbs per 3000 ft² (about 3.2 to about 10.4 kg per 278.7 m²) of the friction generating surface 18, alternatively from about 10 to about 20 lbs per 3000 ft² (about 4.5 to about 9.1 kg per 278.7 m²) of the friction generating surface 18, alternatively from about 12 to about 18 lbs per 3000 ft² (about 5.4 to about 8.2 kg per 278.7 m²) of the friction generating surface 18, alternatively about 15 lbs per 3000 ft² (about 6.8 kg per 278.7 m²) of the friction generating surface 18. The amount of the friction adjusting particles 22 present in the friction generating layer 14 may vary outside of the ranges above, but is typically both whole and fractional values within these ranges. Further, it is to be appreciated that more than one type of the friction adjusting particles 22 may be included in the friction generating layer 14, in which case the total amount of all the friction adjusting particles 22 present in the friction generating layer 14 is within the above ranges.

In a preferred embodiment, the friction adjusting particles 22 and the elastomeric particles 24 are present in the friction generating layer 14 in a weight ratio of from about 3:1 to about 1:1.

Referring now to the fibrillated nanofibers 20 of the friction generating layer 14, the fibrillated nanofibers 20 are chosen from cellulose fibers, aramid fibers, acrylic fibers, and combinations thereof. Alternatively, the fibrillated nanofibers 20 of the friction generating layer 14 comprise, consist essentially of, or consist of, cellulose fibers, aramid fibers, acrylic fibers, or combinations thereof.

In a typical embodiment, the fibrillated nanofibers 20 comprise cellulose. For example, in various embodiments the fibrillated nanofibers 20 comprise natural cellulose, regenerated cellulose, a cellulose derivative, or a mixture thereof. In some embodiments, the fibrillated nanofibers 20 comprise at least 50 wt. %, alternatively at least 60 wt. %, alternatively at least 70 wt. %, alternatively at least 80 wt. %, alternatively at least 90 wt. %, alternatively at least 99 wt. %, alternatively about 100 wt. %, of natural cellulose, regenerated cellulose, a cellulose derivative, or a mixture thereof. In various embodiments, the fibrillated nanofibers 20 consist essentially of, or consist of, cellulose. In some embodiments, the fibrillated nanofibers 20 comprise, consist essentially of, or consist of natural cellulose. In other embodiments, the fibrillated nanofibers 20 comprise, consist essentially of, or consist of, regenerated cellulose. For example, in such other embodiments, the fibrillated nanofibers 20 comprise, consist essentially of, or consist of, regenerated lyocell cellulose.

Natural cellulose is a straight chain polysaccharide that includes repeating β(1→4)-glycosidic-linked glucose units and which has the general polymeric formula $(C_6H_1O_5)_n$ with the number of repeating units ("n") usually ranging from 100 to 10,000. Regenerated cellulose has the same chemical formula as natural cellulose and is prepared from naturally-occurring polymers (e.g. wood pulp or bamboo) from one of several processes including the viscose process, the cuprammonium process, and an organic solvent spinning process. Some examples of regenerated cellulose are rayon, modal, and lyocell. A cellulose derivative is a modified cellulose in which the hydroxyl group on the glucose units is fully or partially substituted with, for example, an ester group. Some examples of a cellulose derivative are cellulose acetate and cellulose triacetate.

In some embodiments, the fibrillated nanofibers 20 comprise aramid. For example, in various embodiments the aramid is synthetic aromatic polyamide. One such example of aromatic polyamide is para-aramid, such as the condensation product of 1,4-phenylene-diamine and terephthaloyl chloride. Another such example of aromatic polyamide is meta-aramid, such as the condensation product of m-phenylenediamine and isophthaloyl chloride.

In some embodiments, the fibrillated nanofibers 20 comprise acrylic. For example, in various embodiments, the acrylic is a synthetic acrylic polymer formed from at least 85 wt. % acrylonitrile monomers.

In various embodiments, the fibrillated nanofibers 20 have average diameters of from about 20 nm to about 800 nm, alternatively from about 30 nm to about 600 nm, alternatively from about 50 nm to about 500 nm, and average lengths of from about 1 mm to about 10 mm, alternatively from about 2 mm to about 8 mm, alternatively from about 4 mm to about 6 mm. In such embodiments, the fibrillated nanofibers 20 typically have a degree of fibrillation as measured according to Canadian Standard Freeness ("CSF") of from about 5 ml CSF to about 300 ml CSF, alternatively from about 10 ml CSF to about 200 ml CSF, alternatively from about 10 ml CSF to about 100 ml CSF. CSF is an empirical test procedure that measures the rate at which 3 grams of a fibrous pulp material in 1 liter of water may be drained. CSF measurements are conducted in accordance with the TAPPI T227 test procedure. In making CSF measurements, it is noted that a more fibrillated fibrous pulp material will have a lower water drainage rate and, thus, a lower "ml CSF" value, and that a less fibrillated fibrous pulp material will have a higher "ml CSF" value.

Further, in various embodiments, the fibrillated nanofibers 20 have a thermal stability of about 200° C. or greater, alternatively 250° C. or greater, alternatively 350° C. or greater. By thermal stability it is meant that the fibrillated nanofibers 20 do not melt, soften, or decompose. The thermal stability of the fibrillated nanofibers 20 is typically determined by TGA. The temperature at which a test sample of the elastomeric particles 24 analyzed via TGA loses 5 wt. % based on a total weight of the test sample is the temperature at which the elastomeric particles 24 lose thermal stability.

The fibrillated nanofibers 20 are typically present in the friction material 10 in an amount of from about 1 to about 6 lbs per 3000 ft$^2$ (about 0.5 kg to about 2.7 kg per 278.7 m$^2$) of the friction generating surface 18, alternatively from about 2 to about 5 lbs per 3000 ft$^2$ (about 0.9 kg to about 2.3 kg per 278.7 m$^2$) of the friction generating surface 18, alternatively from about 2 to about 4 lbs per 3000 ft$^2$ (about 0.9 kg to about 1.8 kg per 278.7 m$^2$) of the friction generating surface 18, alternatively about 3 lbs per 3000 ft$^2$ (about 1.4 kg per 278.7 m$^2$) of the friction generating surface 18. The amount of the fibrillated nanofibers 20 present in the friction generating layer 14 may vary outside of the ranges above, but is typically both whole and fractional values within these ranges. Further, it is to be appreciated that more than one type of the fibrillated nanofibers 20 may be included in the friction generating layer 14, in which case the total amount of all the fibrillated nanofibers 20 present in the friction generating layer 14 is within the above ranges.

In a preferred embodiment, about 6 lbs to about 12 lbs of the elastomeric particles 24, about 10 lbs to about 20 lbs of the friction adjusting particles 22, and about 1 to about 7 lbs of the fibrillated nanofibers 20, each based on about 3000 ft$^2$ of the friction generating surface 18 are present in the friction generating layer 14.

The amounts of the fibrillated nanofibers 20 and the friction adjusting particles 22 can be chosen to affect the frictional characteristics of the friction material 10. The porosity of the friction material 10 at the friction generating surface 18, for instance, is inversely proportional to the amount of the fibrillated nanofibers 20 present in the friction generating layer 14. The amount of the friction adjusting particles 22 present in the friction generating layer 14 influences both the static and dynamic COF that can be achieved at the friction generating surface 18. Although a higher COF generally accompanies a higher amount of friction adjusting particles 22 and vice versa, use of the friction adjusting particles 22 and the fibrillated nanofibers 20 alone does not allow for significant improvement of the static COF of the friction material 10. Advantageously, the use of the elastomeric particles 24 along with the friction adjusting particles 22 and the fibrillated nanofibers 20 in the friction generating layer 14 in the amounts disclosed herein significantly improves the dynamic and static COF of the friction material 10.

In another preferred embodiment, the friction material 10 includes a friction generating layer 14 comprising: (1) fibrillated nanofibers 20 comprising cellulose and having an average length of from about 1 mm to about 10 mm and an average degree of fibrillation of from about 10 mL CSF to about 300 mL CSF as measured by Canadian Standard Freeness, wherein the fibrillated nanofibers 20 are present in the friction generating layer 14 in an amount of from about 1 to about 6 lbs per 3000 ft$^2$ (about 0.5 kg to about 2.7 kg per 278.7 m$^2$) of the friction generating surface 18; (2) the friction adjusting particles 22 comprising diatomaceous earth and present in the friction generating layer 14 an amount of from about 7 to about 23 lbs per 3000 ft$^2$ (about 3.2 to about 10.4 kg per 278.7 m$^2$); and (3) elastomeric particles 24 derived from cashew nut shell oil and having an average diameter of less than about 40 µm, the elastomeric particles 24 present in an amount of from about 3 to about 15 lbs per 3000 ft$^2$ (about 1.4 to about 6.8 kg per 278.7 m$^2$) of the friction generating surface 18. In this embodiment, the curable resin 26 is dispersed throughout the friction generating layer 14 and the base 12 in an amount of less than about 40 wt. % based on 100 parts by weight of the friction material 10. The combination of the fibrillated nanofibers 20, the friction adjusting particles 22, and elastomeric particles 24 in the friction generating layer 14 not only provides the friction material 10 with an excellent dynamic and static COF, the combination advantageously allows for a reduction in the amount of curable resin 26 required, and, as is set forth below, the combination also allows for a reduction in the thickness of the base 12.

Referring now to the base 12 of the friction material 10, the base 12 typically comprises various structural fibers 28 and fillers. In a preferred embodiment, the base 12 comprises the structural fibers 28 which penetrate into the friction generating layer 14 and intermingle with the fibrillated nanofibers 20. To this end, the base 12 can be referred to as indiscreet, just like the friction generating layer 14. In some embodiments, the structural fibers 28 of the base 12 are exposed at the friction generating surface 18. In other embodiments, the structural fibers 28 of the base 12 are not exposed at the friction generating surface 18. The structural fibers 28 are typically chosen from cellulose fibers, aramid fibers, acrylic fibers, glass fibers, ceramic fibers, novoloid (phenol-formaldehyde) fibers, carbon fibers, mineral fibers, and combinations thereof. The various types of cellulose, aramid, and acrylic fibers are just as described above in reference to the fibrillated nanofibers 20 of the friction generating layer 14. Carbon fibers, sometimes referred to as graphite fibers, are fibers comprising carbon atoms. Of course, carbon fibers as discussed herein include fibers formed with carbon and other materials, i.e. composite carbon fibers.

In various embodiments, the structural fibers 28 have average diameters of from about 20 nm to about 2000 nm, alternatively from about 30 nm to about 1750 nm, alternatively from about 50 nm to about 1500 nm, and average lengths of from about 2 mm to about 20 mm, alternatively from about 4 mm to about 18 mm, alternatively from about 6 mm to about 16 mm. In such embodiments, the structural fibers 28 typically have a degree of fibrillation as measured according to CSF of from about 100 ml CSF to about 1000 ml CSF, alternatively from about 100 ml CSF to about 800 ml CSF, alternatively from about 100 ml CSF to about 650 ml CSF.

In one embodiment, the base 12 includes fibrillated micro structural fibers 28 comprising aramid such as poly-para-phenylene terephthalamide. In another embodiment, the base 12 includes structural fibers 28 comprising cellulose. In another embodiment, the base 12 includes structural fibers 28 comprising carbon. In a preferred embodiment, the base 12 includes individual structural fibers 28 comprising, consisting of, or consisting essentially of aramid and cellulose. The combination of these two types of microfibers provides the base 12 with thermal and chemical stability and a high fatigue resistance well above 350° C. The aramid and cellulose structural fibers 28 present in the base 12 of this embodiment may be natural or synthetic.

The structural fibers 28 are typically present in the friction material 10 in an amount of from about 10 to about 90 wt. %, alternatively from about 20 to about 70 wt. %, based on the total weight of the base 12. The amount of the structural fibers 28 present in the base 12 may vary outside of the ranges above, but is typically both whole and fractional values within these ranges. Further, it is to be appreciated that more than one type of the structural fibers 28 may be included in the base 12, in which case the total amount of all the structural fibers 28 present in the base 12 is within the above ranges.

Referring now to the fillers of the base 12, the fillers include chosen from silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, diatomaceous earth, cashew nut particles, and combinations thereof. Alternatively, the fillers of the base 12 comprise, consisting essentially of, or consist of, silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, diatomaceous earth, cashew nut particles, and combinations thereof. In a preferred embodiment, the filler of the base 12 includes a combination of diatomaceous earth and carbon.

In various preferred embodiments, the base 12 is substantially free of the elastomeric particles 24. In these embodiments, the elastomeric particles 24, such as those derived from cashew nut particles, are present in the base 12 in an amount of from less than about 1, alternatively less than about 0.5, alternatively less than about 0.25, alternatively less than about 0.1, alternatively 0, wt. % based on the total weight of the base 12. Of course, in these embodiments, some of the elastomeric particles 24 added to the friction generating layer 14 may intermingle with or penetrate into the base 12, but prior to application of the components of the friction generating layer 14, the base 12 is substantially free of the elastomeric particles 24.

The filler is typically present in the friction material 10 in an amount of from about 20 to about 80 wt. %, alternatively about 20 to about 60 wt. %, based on the total weight of the base 12. The amount of the filler present in the base 12 may vary outside of the ranges above, but is typically both whole and fractional values within these ranges. Further, it is to be appreciated that more than one type of the filler may be included in the base 12, in which case the total amount of all the fillers present in the base 12 is within the above ranges.

Referring now to the curable resin 26 that is dispersed throughout the friction generating layer 14 and the base 12 of the friction material 10. The curable resin 26 may be any thermosetting resin suitable for providing structural strength to the friction material 10. The curable resin 26 may, for example, be a phenolic resin or a modified phenolic resin (e.g. an epoxy phenolic, etc.) A phenolic resin is a class of thermosetting resins that is produced by the condensation of an aromatic alcohol, typically a phenol, and an aldehyde, typically a formaldehyde. A phenolic-based resin is a thermosetting resin blend that includes at least 50 wt. % of a phenolic resin based on the total weight of all resins and excluding any solvents or processing acids. Some examples of other thermosetting resins that may be blended with a phenolic resin include silicone resins, epoxy resins, and polybutadiene resins, to name but a few examples. Once cured, the curable resin 26 is referred to as the cured resin 34. The cured resin 34 confers strength and durability to the friction material 10 and adheres the elastomeric particles 24, the fibrillated nanofibers 20, and the friction adjusting particles 22 in the friction generating layer 14 while maintaining a desired porosity for proper lubricant flow and retention.

The curable resin 26 is present in the friction material 10 in an amount of less than about 50 wt. %, alternatively less than about 45, alternatively less than about 40, alternatively from about 20 wt. % to about 35 wt. %, alternatively from about 25 wt. % to about 30 wt. %, based on 100 parts by weight of the friction material 10. Advantageously, the combination of the elastomeric particles 24, the fibrillated nanofibers 20, and the friction adjusting particles 22 in the friction generating layer 14 allows for reduction in an amount of the curable resin 26 in the friction material 10 providing excellent performance properties (e.g. COF and wear properties).

Figure 3:
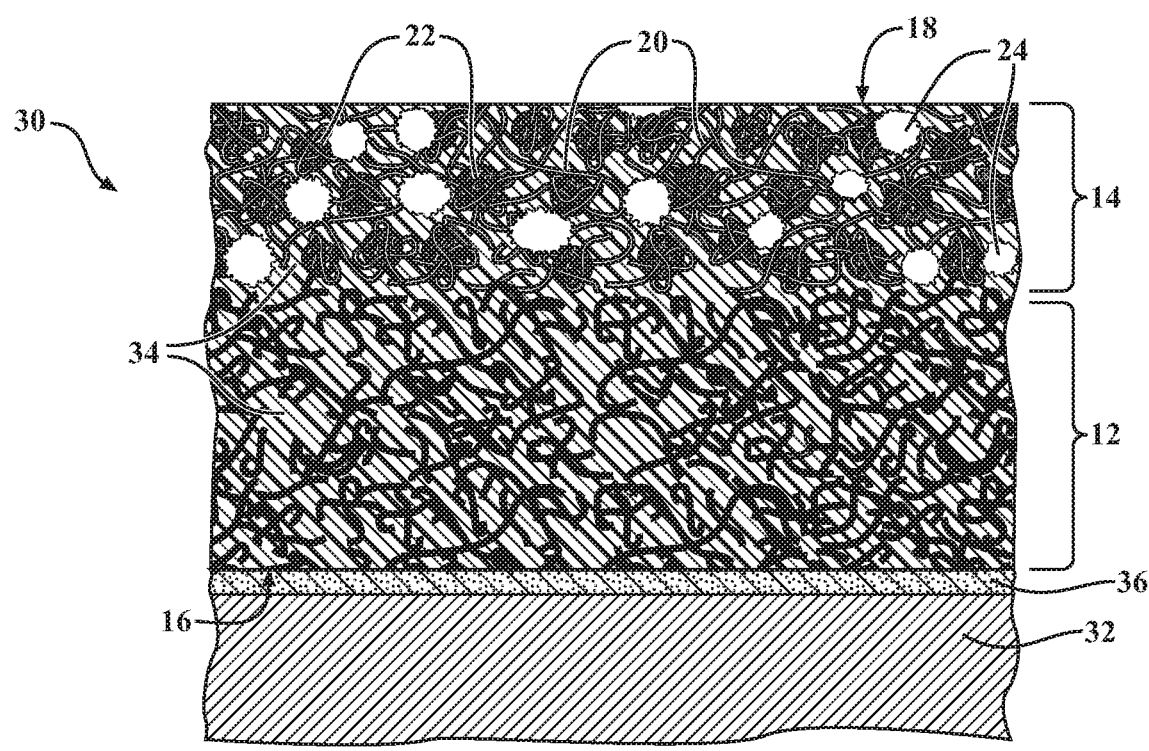
FIG. 3 is an enlarged cross-sectional view of a friction plate including the friction material of FIG. 1 and a substrate.

Referring now to FIG. 3, the friction plate 30 comprises the friction material 10, which is cured (i.e. comprising cured resin 34) bonded to a substrate 32 with a bonding adhesive 36. The bonding surface 16 is the surface of the friction material 10 where bonding to the substrate 32 or other material is meant to be accomplished. As such, the bonding surface 16 of the base 12 is bonded to a substrate 32.

The porous friction material 10 is bonded to the substrate 32 by any suitable technique known to skilled artisans. Typically, the friction material 10 is bonded to the substrate 32 with the bonding adhesive 36, which is generally known to those skilled in the art, e.g. with a bonding adhesive 36 comprising phenolic modified nitrile rubber. Exemplary substrates 32 include, but are not limited to, friction/clutch plates, synchronizer rings, and transmission bands. The substrate 32 is typically metal.

As alluded to above, the various embodiments of the friction material 10 described herein may be used in a wet clutch. The friction generating surface 18 of the friction material 10 experiences interfacial frictional engagement with an opposed mating surface (not shown) in the presence of a lubricant. The friction generating surface 18 experiences select interfacial frictional engagement with an opposed, rotating surface (not shown) in the presence of a lubricant, and the bonding surface 16 achieves bonded attachment to the substrate 32 with the aid of an adhesive or some other suitable bonding technique. The lubricant may be any suitable lubricating fluid such as, for example, an automatic transmission fluid. While the friction material 10 performs satisfactorily above about 350° C., alternatively about 400° C., alternatively about 450° C., it is not limited only to such high-temperature environments and may, if desired, be used in a wet clutch designed to maintain a temperature at the friction generating surface 18 below 350° C.

The friction material 10 can maintain a positive μ-v relationship and resist glazing because its friction generating surface 18 is able to be repeatedly regenerated. Such regeneration can be attributed to the presence of the fibrillated cellulose nanofibers and their supported friction adjusting particles 22. The balanced content of those two materials (the fibrillated nanofibers 20 and the friction adjusting particles 22) provides enough friction adjusting particles 22 at or near the friction generating surface 18 to sustain a positive μ-v relationship at elevated temperatures while permitting the fibrillated cellulose nanofibers closest to the friction generating surface 18 to thermally decompose at regular intervals.

In addition, the combination of the fibrillated nanofibers 20, the friction adjusting particles 22, and elastomeric particles 24 in the friction generating layer 14 provides a friction material 10 with excellent dynamic and static COF, the combination advantageously allows for a reduction in the amount of curable resin 26 required, and also allows for a reduction in the thickness of the base 12, as is set forth in the Examples below. Without being bound by theory, it is believed that the elastomeric particles 24 of friction generating layer 14 and a reduced amount of curable resin 26 increase the compressibility of the friction generating layer 14. In turn, many such embodiments of the friction material 10 exhibit excellent dynamic and static COF as well as durability characteristics in wet clutch applications.

The following examples are meant to illustrate the disclosure and are not to be viewed in any way as limiting to the scope of the disclosure.

EXAMPLES

Example friction materials representative of this disclosure (Examples 1 and 2) are formed along with three comparative examples of friction materials that are not representative of this disclosure (Comparative Examples 1-3.) After formation, the Examples and the Comparative Examples are evaluated to determine a variety of performance properties. The compositions of Examples 1 and 2 and Comparative Examples 1-3 are set forth in Table 1 below.

TABLE 1

| Friction Material | Component | Example 1 | Example 2 | Comparative Example 1 | Comparative Example 2 | Comparative Example 3 |
|---|---|---|---|---|---|---|
| Base A | Structural Fibers A and B | 40-60 wt. % | 40-60 wt. % | 40-60 wt. % | 40-60 wt. % | 40-60 wt. % |
| | Fillers A and B | 35-55 wt. % | 35-55 wt. % | 35-55 wt. % | 35-55 wt. % | 35-55 wt. % |
| Friction Generating Layer | Friction Adjusting Particle | 10-20 lbs/ 3000 ft$^2$ | 10-20 lbs/ 3000 ft$^2$ | — | 10-20 lbs/ 3000 ft$^2$ | 10-20 lbs/ 3000 ft$^2$ |
| | Fibrillated Nanofiber | 2-5 lbs/ 3000 ft$^2$ | 2-5 lbs/ 3000 ft$^2$ | — | 2-5 lbs/ 3000 ft$^2$ | 2-5 lbs/ 3000 ft$^2$ |
| | Elastomeric Particle | 6-12 lbs/ 3000 ft$^2$ | 6-12 lbs/ 3000 ft$^2$ | — | — | — |
| Curable Resin | Phenolic Resin | 35-45 | 23-33 | 35-45 | 35-45 | 23-33 |

Structural Fibers A and B comprise aramid and natural cellulose, respectively.

Fillers A and B comprise diatomaceous earth and graphite, respectively.

Friction Adjusting Particle is diatomaceous earth having a Mohs hardness of from about 5.5 to about 6.

Fibrillated Nanofiber is a lyocell cellulose fiber.

Elastomeric Particle is a particle comprising a cashew nut shell oil derivative having a mean diameter of about 12 μm and a compressibility of from about 1.5 to 7.5%.

Examples 1 and 2 and Comparative Examples 1-3 are cured and bonded to a metal substrate to form friction plates.

The friction plates including the friction materials of Example 1 and Comparative Examples 1 and 2 are then tested in duplicate on a No. 2 Friction Test Machine in accordance with SAE procedure J2490 (μPVT). The SAE No. 2 Friction Test Machine is used to evaluate the friction characteristics of automatic transmission plate clutches with automotive transmission fluids as well as durability tests on wet friction systems. Testing was conducted in Dual Clutch Transmission ("DCT") fluid.

Figure 4:
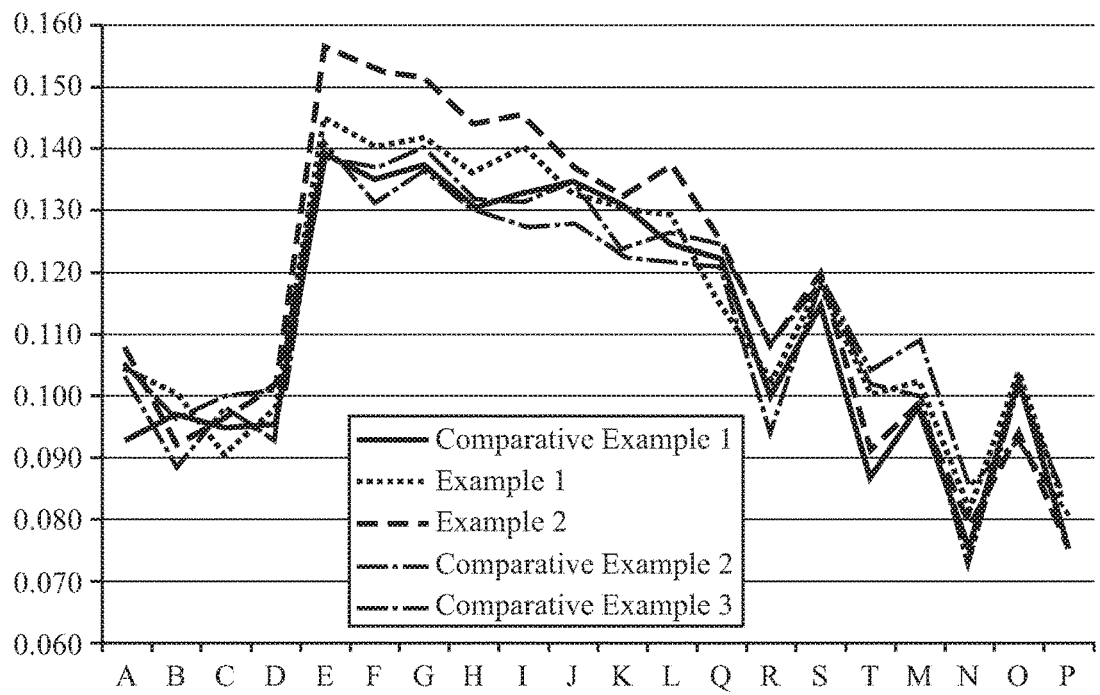
FIG. 4 is a graph of static COF over a number of engagement/disengagement cycles for the various Examples and Comparative Examples set forth in the subject disclosure.
Figure 5:
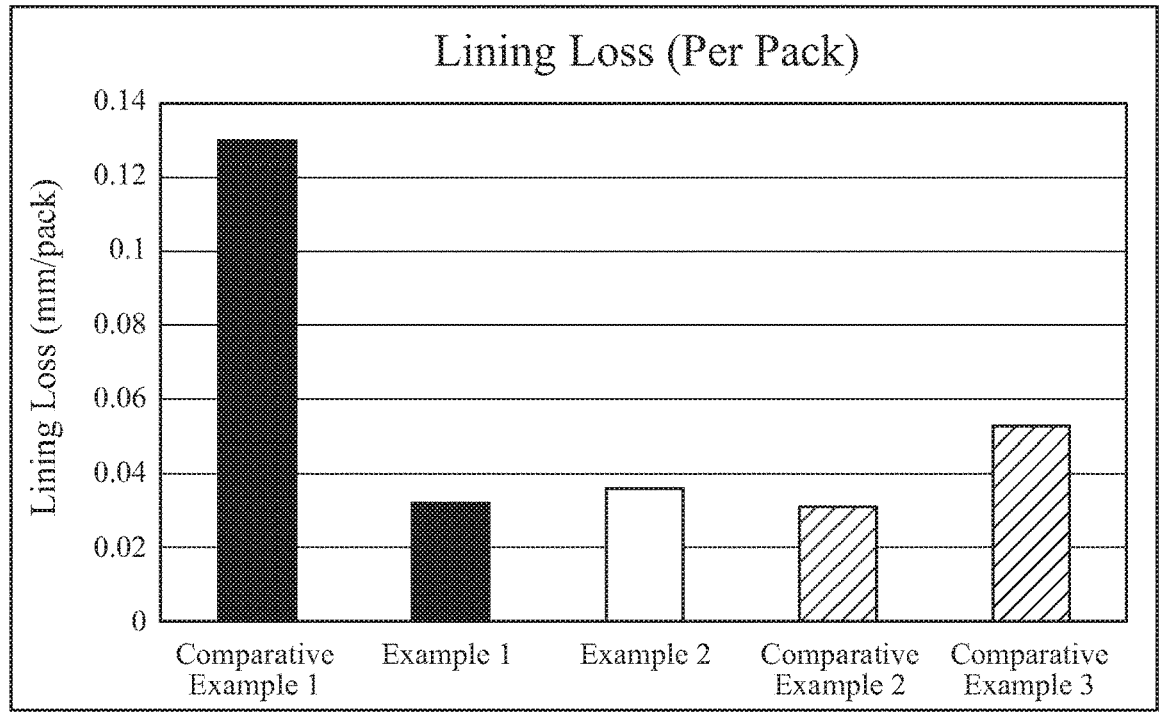
FIG. 5 is a bar graph of the durability (lining loss per pack) for the various Examples and Comparative Examples set forth in the subject disclosure.

Measurements for Initial COF, Midpoint COF, Static COF, E/M ratio were plotted against the number of friction material engagement/disengagement cycles. The Static COF of the Examples and Comparative Examples is set forth in FIG. 4. In FIG. 4, Examples 1 and 2 demonstrate improved static COF over the Comparative Examples. Durability testing (lining loss mm/pack) was conducted as well. The durability of the Examples and Comparative Examples is set forth in FIG. 5. In FIG. 5, Examples 1 and 2 demonstrate improved durability over the Comparative Examples. Further, Example 2, which includes less wt. % resin, demonstrates improved friction characteristics over Example 1, which includes more wt. % resin. That is, the friction generating layer of the subject disclosure requires less resin and demonstrates improved friction and durability characteristics with less resin.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e. from 0.1 to 0.3, a middle third, i.e. from 0.4 to 0.6, and an upper third, i.e. from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described in an illustrative manner, and it is to be understood that the terminology which has been used is intended to be in the nature of words of description rather than of limitation. Obviously, many modifications and variations of the present disclosure are possible in light of the above teachings. It is, therefore, to be understood that within the scope of the appended claims, the present disclosure may be practiced otherwise than as specifically described.

What is claimed is:

1. A porous friction material comprising:
   (A) a base presenting a bonding surface, said base comprising structural fibers and a filler;
   (B) a friction generating layer penetrating into and integral with said base and presenting a friction generating surface facing opposite said bonding surface of said base, said friction generating layer comprising:
      (i) fibrillated nanofibers present in an amount of from about 2 to about 5 lbs per 3000 ft$^2$ of said friction generating surface;
      (ii) friction adjusting particles present in an amount of from about 10 to about 20 lbs per 3000 ft$^2$ of said friction generating surface; and
      (iii) elastomeric particles having a compressibility of from about 1 to about 10% when tested in accordance with ISO 6310, said elastomeric particles present in an amount of from about 6 to about 12 lbs per 3000 ft$^2$ of said friction generating surface; and
   (C) a phenolic resin and/or a modified phenolic resin dispersed throughout said friction generating layer and said base, wherein said phenolic resin and/or said modified phenolic resin is present in an amount of 23 to 45 wt. %, based on a total weight of the porous friction material.

2. The porous friction material as set forth in claim 1 wherein said elastomeric particles are chosen from particles derived from cashew nut shell oil, rubber, and combinations thereof.

3. The porous friction material as set forth in claim 1 wherein said elastomeric particles are chosen from silicone rubber, styrene butadiene rubber, butyl rubber, ethylene acrylic rubber, chlorobutyl rubber, bromobutyl rubber, polychloroprene rubber, nitrile rubber, fluoroelastomer, and combinations thereof.

4. The porous friction material as set forth in claim 1 wherein said elastomeric particles are derived from cashew nut shell oil.

5. The porous friction material as set forth in claim 1 wherein said elastomeric particles have an average diameter of less than about 40 μm.

6. The porous friction material as set forth in claim 1 wherein said elastomeric particles have a thermal stability of about 200° C. or greater.

7. The porous friction material as set forth in claim 1 wherein said friction adjusting particles are chosen from silica, carbon, graphite, alumina, magnesia, calcium oxide, titania, ceria, zirconia, cordierite, mullite, sillimanite, spodumene, petalite, zircon, silicon carbide, titanium carbide, boron carbide, hafnium carbide, silicon nitride, titanium nitride, titanium boride, and combinations thereof.

8. The porous friction material as set forth in claim 1 wherein said elastomeric particles have a compressibility of from about 1.5 to about 7.5% when tested in accordance with ISO 6310 and said friction adjusting particles have a Mohs hardness of from about 5 to about 6.5.

9. The porous friction material as set forth in claim 1 wherein said friction adjusting particles are present in an amount of from about 12 to about 18 lbs per 3000 ft$^2$ of said friction generating surface.

10. The porous friction material as set forth in claim 1 wherein said friction adjusting particles and said elastomeric particles are present in a weight ratio of from about 3:1 to about 1:1.

11. The porous friction material as set forth in claim 1 wherein said fibrillated nanofibers are chosen from acrylic fibers, aramid fibers, carbon fibers, cellulose fibers, and combinations thereof, and are present in an amount of from about 2 to about 4 lbs per 3000 ft$^2$ of said friction generating surface.

12. The porous friction material as set forth in claim 1 having a thickness defined as a distance between said friction generating surface and said bonding surface wherein said friction generating layer extends from said friction generating surface towards said bonding surface up to about 40% of said thickness.

13. The porous friction material as set forth in claim 1 wherein said friction generating layer consists essentially of said fibrillated nanofibers, said friction adjusting particles, and said elastomeric particles.

14. The porous friction material as set forth in claim 1 wherein said base comprises structural fibers which penetrate into said friction generating layer and intermingle with said fibrillated nanofibers.

15. The porous friction material as set forth in claim 1 wherein said base is substantially free of elastomeric particles.

16. A friction plate comprising the porous friction material as set forth in claim 1 which is cured, wherein said bonding surface of said base of said cured porous friction material is bonded to a substrate.

17. A porous friction material comprising:
(A) a base presenting a bonding surface;
(B) a friction generating layer penetrating into and integral with said base and presenting a friction generating surface facing opposite said bonding surface of said base, said friction generating layer comprising:
  (i) fibrillated nanofibers comprising cellulose and having an average length of from about 1 mm to about 10 mm and an average degree of fibrillation of from about 10 mL CSF to about 300 mL CSF as measured by Canadian Standard Freeness, wherein said fibrillated nanofibers are present in the friction generating layer in an amount of from about 2 to about 5 lbs per 3000 ft$^2$ of said friction generating surface;
  (ii) friction adjusting particles comprising diatomaceous earth and present in the friction generating layer in an amount of from about 10 to about 20 lbs 3000 ft$^2$ of said friction generating surface; and
  (iii) elastomeric particles, said elastomeric particles:
    chosen from silicone rubber, styrene butadiene rubber, butyl rubber, ethylene acrylic rubber, chlorobutyl rubber, bromobutyl rubber, polychloroprene rubber, nitrile rubber, fluoroelastomer, and combinations thereof,
    having an average diameter of less than about 40 μm, and
    present in an amount of from about 6 to about 12 lbs per 3000 ft$^2$ of said friction generating surface; and
(C) a phenolic resin and/or a modified phenolic resin dispersed throughout said friction generating layer and said base in an amount of 23 to 45 wt. % based on a total weight of said porous friction material.

\* \* \* \* \*